United States Patent
Chen

[19]

[11] Patent Number: 5,881,058
[45] Date of Patent: Mar. 9, 1999

[54] METHOD FOR PERFORMING A SIGNAL SEARCH IN A WIRELESS COMMUNICATION SYSTEM

[75] Inventor: Jiangnan Chen, Darian, Ill.

[73] Assignee: Motorola, Inc., Schaumburg, Ill.

[21] Appl. No.: 758,269

[22] Filed: Nov. 25, 1996

[51] Int. Cl.$^6$ .................................................. H04J 13/00
[52] U.S. Cl. ........................ 370/335; 370/342; 375/200
[58] Field of Search .................................. 370/319, 320, 370/328, 329, 331, 332, 334, 335, 342, 441, 479; 375/200, 206, 208, 209, 210, 346, 347, 348, 349; 455/63, 65, 562

[56] References Cited

U.S. PATENT DOCUMENTS

| | | | |
|---|---|---|---|
| 5,490,165 | 2/1996 | Blakeney, II et al. | 370/335 |
| 5,530,716 | 6/1996 | Lipa | 370/342 |
| 5,654,979 | 8/1997 | Levin et al. | 375/206 |
| 5,671,221 | 9/1997 | Yang | 370/320 |
| 5,680,395 | 10/1997 | Weaver, Jr. et al. | 370/331 |
| 5,710,768 | 1/1998 | Ziv et al. | 370/324 |
| 5,740,526 | 4/1998 | Bonta et al. | 455/277.2 |

*Primary Examiner*—Chi H. Pham
*Assistant Examiner*—Kwang B. Yao
*Attorney, Agent, or Firm*—Heather L. Creps

[57] ABSTRACT

The method, which operates in a code division multiple access wireless communication system including a base site having a first and second antenna for receiving communication signals from a mobile unit and a base site receiver for demodulating the communications, includes receiving at a first antenna a first set of signals of the communication signals; processing, by a searcher, the first set of signals to produce an output indicative of a winning correlation energy and an associated pn-offset for at least one of the first set of signals; receiving at a second antenna a second set of signals of the communication signals; and using the output to coordinate demodulation of the at least one of the first set of signals of the communication signals, as a function of its pn-offset, while simultaneously processing, by the searcher, the second set of signals.

13 Claims, 4 Drawing Sheets

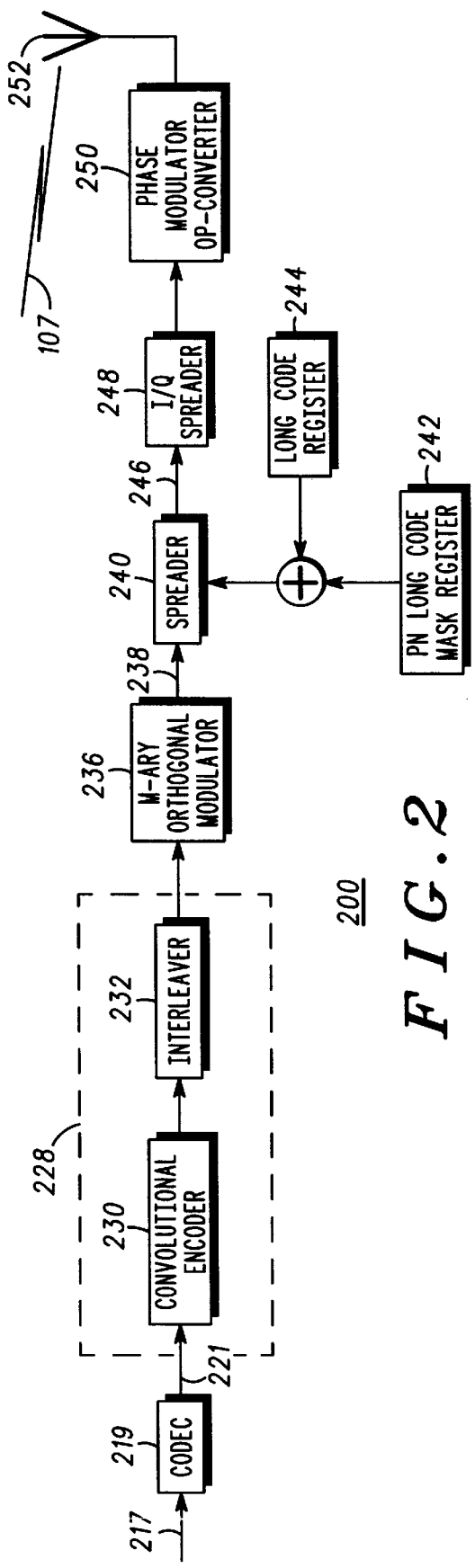
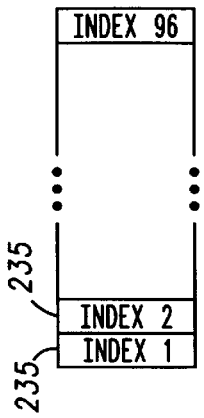
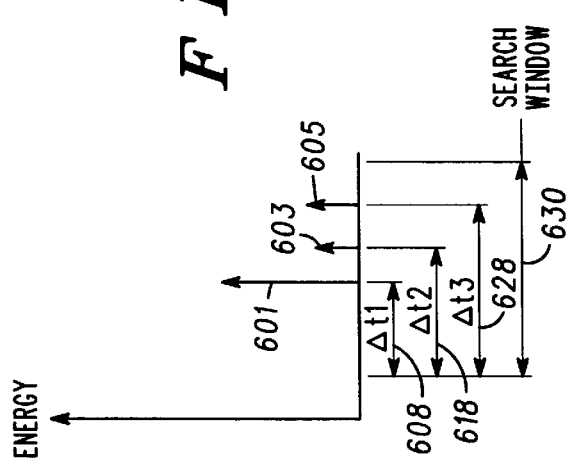

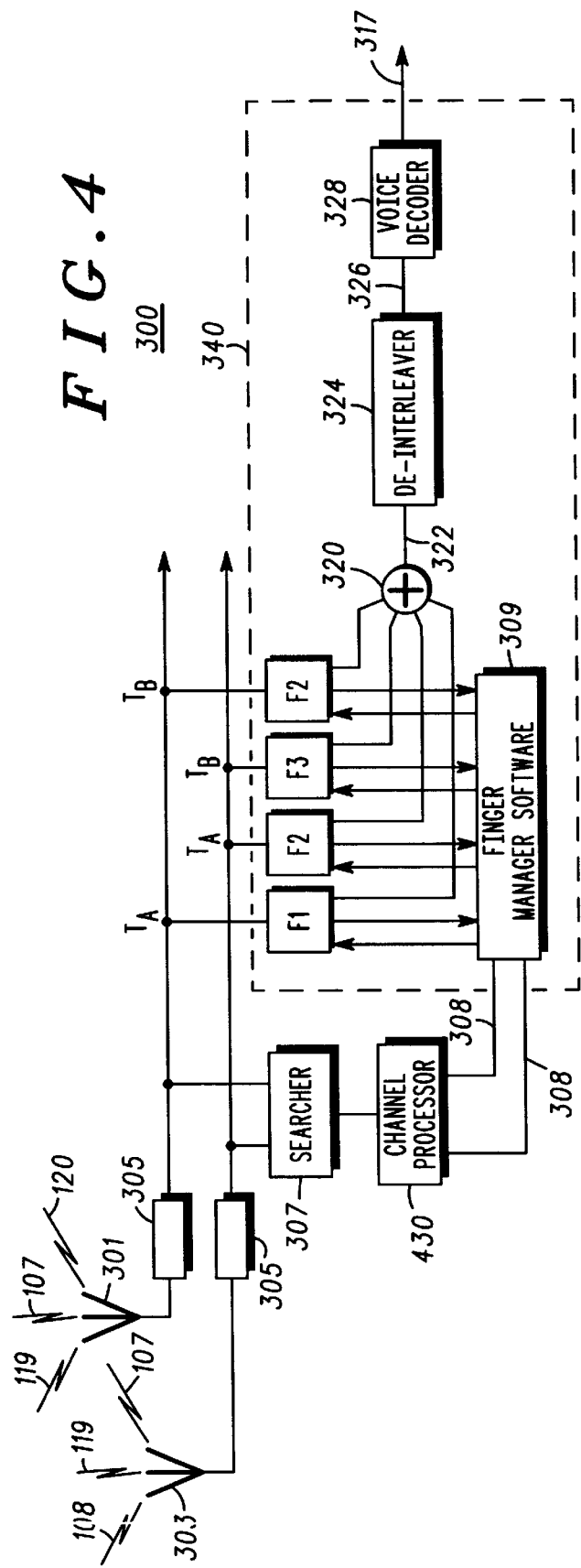

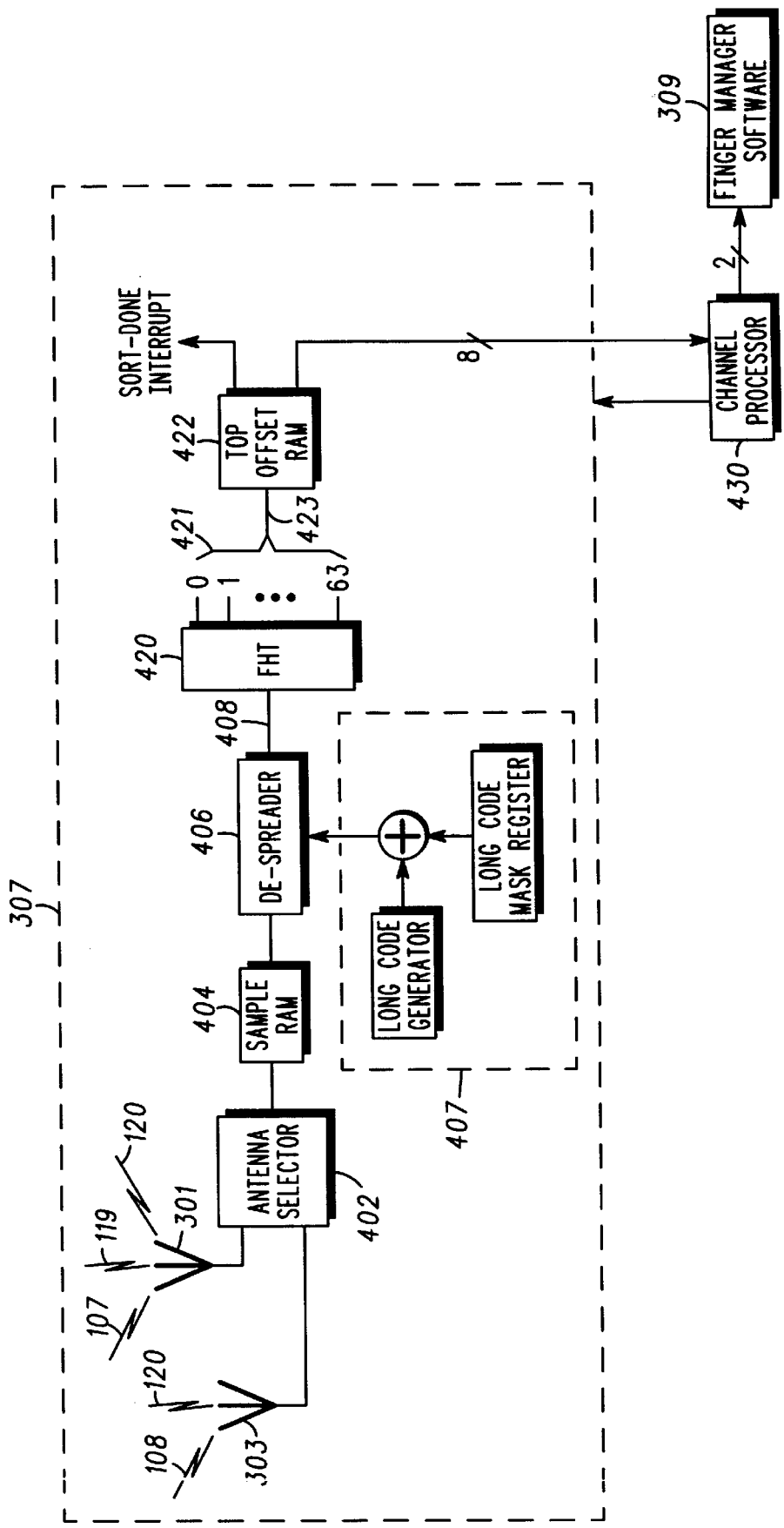

METHOD FOR PERFORMING A SIGNAL SEARCH IN A WIRELESS COMMUNICATION SYSTEM

FIELD OF THE INVENTION

The present invention relates generally to wireless communication systems and, more particularly, to a method for performing a signal search within a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95A (TIA/EIA IS-95A) herein after referred to as IS-95A and incorporated herein by reference. In accordance with IS-95A, the coded communication signals used in the DS-CDMA system comprise signals that are transmitted in a common 1.25 MHz bandwidth to base sites of the system from communication units, such as mobile or portable radiotelephones, that are communicating in the coverage areas of the base sites. Each DS-CDMA signal includes, inter alia, a pseudorandom noise (PN) binary code associated with a particular base site and a PN sequence associated with a particular communication unit.

During a typical communication, a communication unit often travels within a coverage area of a base site that is supporting the communication. Such movement typically results in fading of the communication signal transmitted from the communication unit, henceforth referred to as a mobile unit, to the base site due to multipath propagation of the transmitted signal. As is known, multipath propagation results from the reflections of the transmitted signal off of nearby scatterers, such as buildings. These reflections produce replicas of the originally transmitted signal that arrive at the base site at various times depending on the effective propagation distances traveled by the replicas. The originally transmitted signal and multipath replicas are typically referred to as multipath signals of the originally transmitted signal.

To demodulate the transmissions from a particular mobile unit, a base site receiver must first identify the multipath signals associated with that mobile unit. This identification of a particular mobile unit's multipath signal(s), as well as their locations with reference to an offset in time (referred to as a pn-offset), is known in the art as an antenna, or signal, search.

In a sectorized antenna system, there are N sectors and M antennas for each of the sectors. For a typical demodulation process, the searching process is done within a single sector. The order of searching is typically set such that the antennas within a sector are searched serially. When multiple antennas are specified, the receiver may be directed to demodulate specific multipath signals only after all of the antennas have been searched. After all antennae have been searched, an interrupt, such as a sort_done interrupt, may be generated and an array of eight data points, referred to as winning correlation energies, may be produced. It is these data points which are used to direct the receiver to demodulate specific multipath signals at specific pn-offset locations.

If a mobile unit is in a softer hand-off or sector-to-sector hand-off, N sectors may be involved, and a total of N×M antennas may be searched one after another during a complete searching process before the receiver begins the demodulation process. For example, if N=1, and M=2, then the normal traffic channel demodulation process has two antennas to be searched within one sector before a sort_done interrupt is generated. In a two-way softer hand-off, the multipath demodulation process will have four antennas to be searched, two for each of the two sectors, prior to generating a sort_done interrupt. Hence, receiver demodulation at the newly found signal path pn-offset, will typically not occur until sufficient time has elapsed to complete the serial search of all specified antennas.

Therefore, a need exists for a method for performing a signal search in a wireless communication system which significantly reduces the time interval from, receiving the communication signals at base site antennae, to demodulating the communication signals at the base site receiver.

SUMMARY OF THE INVENTION

According to an aspect of the present invention, the foregoing need is addressed by a method for performing a signal search in a code division multiple access wireless communication system including a base site having a first and second antenna for receiving communication signals from a mobile unit and a base site receiver for demodulating the communications, includes receiving at a first antenna a first set of signals of the communication signals; processing, by a searcher, the first set of signals to produce an output indicative of a winning correlation energy and an associated pn-offset for at least one of the first set of signals; receiving at a second antenna a second set of signals of the communication signals; and using the output to coordinate demodulation of the at least one of the first set of signals of the communication signals, as a function of its pn-offset, while simultaneously processing, by the searcher, the second set of signals.

According to another aspect of the present invention, the foregoing need is also addressed by a method for performing a signal search in a code division multiple access wireless communication system including receiving a communication signal at a first antenna to produce a first received signal; inputting, at a first time offset, at least a portion of the first received signal to a demodulator having a plurality of outputs to produce a first set of outputs; selecting an output from the first set of outputs to produce a first selected output; inputting, at a second time offset, at least a portion of the first received signal to a demodulator to produce a second set of outputs; selecting an output from the second set of outputs to produce a second selected output; after selecting the first selected output and the second selected output, adjusting a time for receiving the communication signal; after adjusting the time, receiving the communication signal at a second antenna to produce a second received signal; inputting, at a first time offset, at least a portion of the second received signal to the demodulator to produce a third set of outputs; selecting an output from the third set of outputs to produce a third selected output; inputting, at the second time offset, at least a portion of the second received signal to the demodulator to produce a fourth set of outputs; selecting an output from the fourth set of outputs to produce a forth selected output; and after selecting the third selected output and the fourth selected output, adjusting the time for receiving the communication signal.

BRIEF DESCRIPTION OF THE DRAWINGS

FIG. 2 is a block diagram of a mobile unit transmitter for generating a communication signal.

FIG. 3 is a diagram of a digitally encoded and interleaved frame created by the transmitter in FIG. 2.

FIG. 4 is a partial block diagram of an apparatus for receiving the communication signal generated by the transmitter depicted in FIG. 2, according to a preferred embodiment of the present invention.

FIG. 5 is a partial block diagram of a searcher depicted in FIG. 4, according to a preferred embodiment the present invention.

FIG. 6 is an example of correlation energies, output from the FHT in FIG. 5, at their associated pn-offsets.

DETAILED DESCRIPTION OF THE PREFERRED EMBODIMENT

Figure 1:
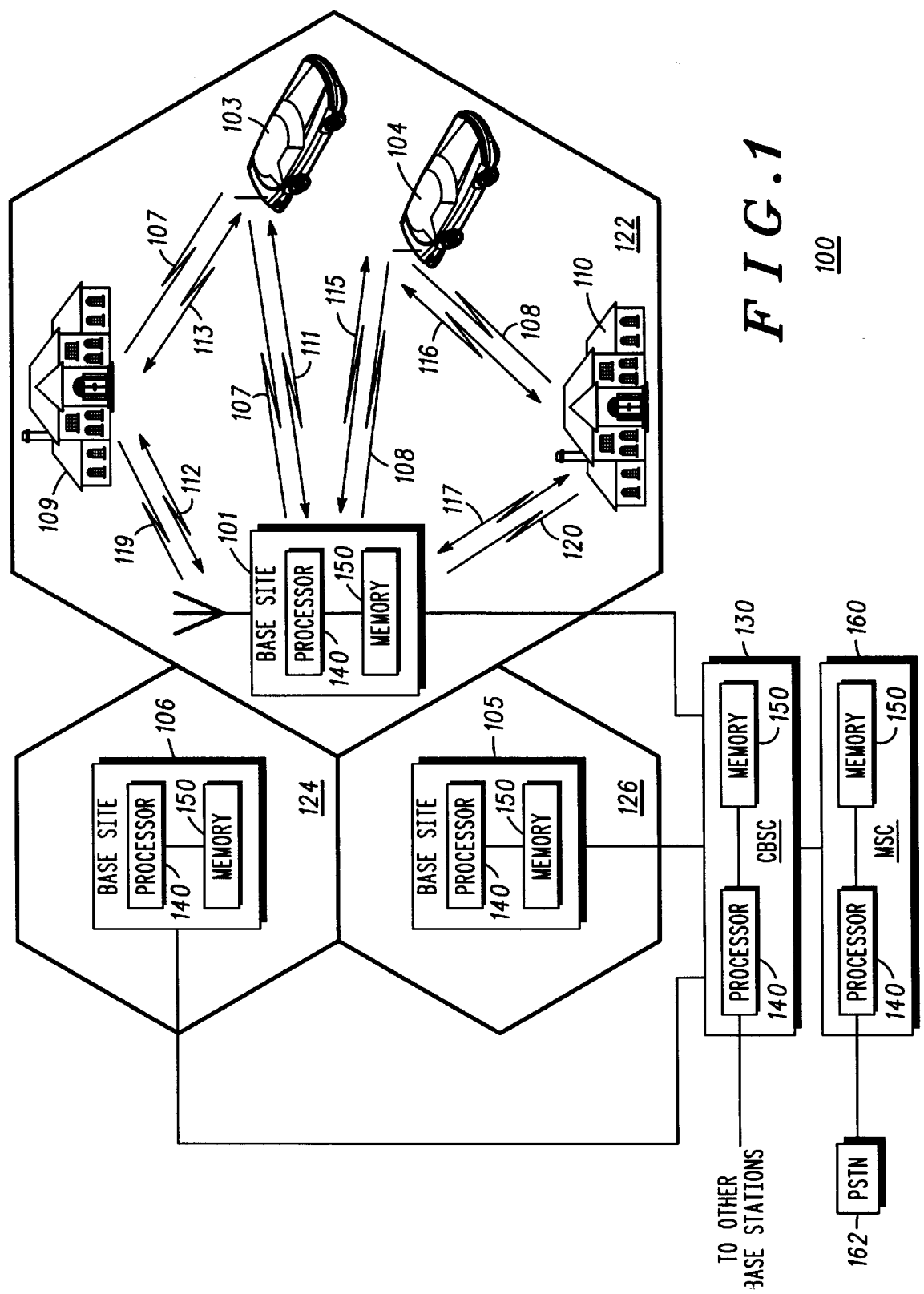
FIG. 1 depicts a typical wireless communication system.

Turning now to the drawings, wherein like numerals designate like components, FIG. 1 illustrates a typical communication system 100. Communication system 100 preferably comprises a direct sequence code division multiple access (DS-CDMA) cellular communication system, such as that set forth in the Telecommunications Industry Association Interim Communication system 100 includes base sites 101, 106, 105 and one or more communication units 103, 104. Base site 101 includes, among other things, a processor 140 and a memory 150. Base site 101 preferably includes a receiver (discussed further below) that receives coded communication signals from communication units 103 and 104 within a coverage area 122 of base site 101, and a transmitter (discussed further below) that transmits coded communication signals to communication units 103 and 104. Each of the communication units 103 and 104, preferably comprises a mobile unit or portable radiotelephone.

Base site 101 is coupled to a base station controller 130, which includes, among other things, a processor 140 and a memory 150, and which is in turn coupled to a mobile switching center 160, also including a processor 140 and a memory 150. Mobile switching center 160 is coupled to the public switched telephone network (PSIN) 162 using known techniques.

Signals 107 and 108 are conveyed between mobile units 103 and 104, respectively, and base site 101 through a radio frequency (RF) channel. The RF channel includes a reverse link (mobile units 103 and 104 to base site 101) and a foward link (base site 101 to mobile units 103 and 104). Communication signals 107 and 108 include a pseudo-random binary code or initial state pseudo-random long code (not shown) associated with and assigned by base site 101, and an identification code or mobile unique pseudo-random long code mask (not shown). This results in a mobile unique pseudo-random noise sequence (PN sequence), one for each mobile unit 103 and 104, which is associated with base site 101.

Signals 119 and 120 are multipath replicas of mobile transmitted signals 107 and 108, respectively, due, for example, to reflections of transmitted signals 107 and 108 off of scatterers 109 and 110. Multipath replicas 119 and 120 arrive at base site 101 at varying times corresponding to propagation distances 111, 112, and 113, and, distances 115, 116, and 117 of transmitted signals 107 and 108 and multipath replicas 119 and 120 respectively.

FIG. 2 is a block diagram of a transmitter 200, for use in a mobile unit such as mobile unit 103, for generating communication signal 107. A data bit stream 217, which may be voice, video or another type of information, enters a variable-rate coder 219, which produces a signal 221 comprised of a series of transmit channel frames having varying transmit data rates. The data rate of each frame depends on the characteristics of data bit stream 217.

Encoder block 228 includes a convolutional encoder 230 and an interleaver 232. At convolutional encoder 230, the transmit channel frame may be encoded by a rate ⅓ encoder using well known algorithms such as convolutional encoding algorithms which facilitate subsequent decoding of the frames. Interleaver 232 operates to shuffle the contents of the frames using commonly known techniques such as block interleaving techniques.

As shown in FIG. 3, each frame 234 of digitally coded and interleaved bits includes ninety-six groups of six coded bits, for a total of 576 bits. Each group of six coded bits represents an index 235 to one of sixty-four symbols such as Walsh code symbols. A Walsh code symbol corresponds to a single row or column of a sixty-four-by-sixty-four Hadamard matrix, a square matrix of bits with a dimension that is a power of two. Typically, the bits comprising a Walsh code symbol are referred to as Walsh chips.

Referring again to FIG. 2, each of the ninety-six Walsh code indices 235 in frame 234 are input to an M-ary orthogonal modulator 236, which is preferably a sixty-four-ary orthogonal modulator. For each input Walsh code index 235, M-ary orthogonal modulator 236 generates, at output 238, a corresponding sixty-four-chip Walsh symbol W 239. Thus, a series of ninety-six, sixty-four-chip Walsh symbols W 239 are generated for each frame 234 input to M-ary orthogonal modulator 236 and are based on the input bit stream.

Spreader block 240, among other things, applies a pseudorandom noise (PN) sequence to the series of Walsh codes W 239 using well-known scrambling techniques. Typically, in DS-CDMA, spreader block 240 spreads the series of of Walsh symbols using a mobile unique PN sequence. The mobile unique PN sequence is the result of the sum of the mobile unique pseudo-random long code mask generated by a PN long code mask register 242, and an initial state pseudo-random long code generated by long code register 244, the initial state pseudo-random long code determined by a Global Position Satellite (GPS) system (not shown) and initiated by the base site. Upon receipt of mobile transmitted signal 107, the base site uses the mobile unique PN sequence as a mobile identifier (discussed further below).

At block 248, the scrambled series of sixty-four-chip Walsh symbols 246 is a phase modulated using an offset quaternary phase-shift keying (OQPSK) modulation process or another modulation process. The resulting signal is then up-converted 250 and transmitted as communication signal S(T) 107 from antenna 252.

FIG. 4 is a block diagram of a base site receiver 300 according to a preferred embodiment of the present invention. Receiver 300 may be within base station 101 (shown in FIG. 1), for receiving a mobile unit's transmission signal such as signals 107 and 119, associated with mobile unit 103, and signals 108 and 120 associated with mobile unit 104. For purposes of discussion, two antennas 301 and 303, representing one sector, are shown. Antennae 301 and 303 receive signals 107, 119, 108 and 120. Front-end processing such as filtering and frequency down-converting of signals 107, 119, 108, and 120 is performed by well known methods and circuits at block 305.

Upon receiving signals 107, 119, 108, and 120, searcher 307 at base site 101 stores the information (e.g. digitized voice or data) contained in received signals 107, 119, 108, and 120 during a plurality of time intervals. Upon storing the information, searcher 307 searches the stored information to identify multipath signals (e.g. signals 107 and 119) associated with a particular mobile unit such as mobile unit 103.

According to a preferred embodiment of the present invention, an antenna, or signal, search may be initiated by a channel processor 430 via enabling a search enable bit of a searcher control register (not shown). Channel processor 430 may be implemented using a digital signal processor (DSP) or may be included as an ASIC operation mode. Searcher 307, using autocorrelation techniques well known in the art, seeks to eliminate "noise", resulting from other mobile units as well as other noise sources, in order to yield an incoming bit stream associated with a signal of a mobile unit, such as mobile unit 103. The time offset at which signal 107 is captured is referred to as a pn_offset. The search may be performed sequentially over a plurality of pn-offsets such that outputs 308 from channel processor 430 correspond to multipath signals received from mobile unit 103. Outputs 308 are used to direct Rake receiver demodulation according to well-known methods.

For example, outputs 308 may include, two of an array of eight correlation energies (discussed further below) at their associated pn-offsets, as determined by a preselected energy output threshold. Software 309, such as finger manager software uses outputs 308 to assign Rake receiver fingers F1, F2, F3 and F4, to secure specific multipath signals for demodulation. Each finger F1, F2, F3, and F4, may have independent antenna selection capability.

FIG. 5 is a detailed block diagram of searcher 307, depicted in FIG. 4. Searcher 307 may be implemented using an application specific integrated circuit (ASIC) or using other suitable means. Searcher 307, the operation and construction of searchers being generally well known, attempts to lock onto received signals 107, 119, 108, and 120, at approximately the time of reception of received signals 107, 119, 108, and 120, at a plurality of pn-offsets.

Returning to FIG. 5, samples from incoming transmitted signals 107, 119, 108, and 120, selected from antenna 301, are stored in a sample ram buffer 404. Next, a despreader 406 functions to remove unwanted signal bits such as interference noise bits and undesired mobile signal bits from other incoming mobile units' transmissions. For example, using autocorrelation properties well known in the art, despreader 406 may identify that a particular signal, such as signal 107, is associated with mobile unit 103, via generating a reference PN sequence associated with base site 101 and correlating it to the mobile unique PN sequence contained in signal 107 received at an initial time offset. As is well known, the initial time offset may be derived from a time delay contribution attributed to the theoretical minimum distance between mobile unit such as mobile unit 103, and a base site antenna such as base site antenna 301. Thus, an output 408, of despreader 406, may be a sequence of groups of received bits which, at the time of transmission from mobile unit 103, were groups of sixty-four Walsh bits such as W239 (shown in FIG. 2) but, which may have been altered during transmission by channel conditions such as multipath fading.

Despread signal 408 may be autocorrelated using a demodulator such as a fast hadamard transform (FHT) 420, to compute received correlation energy (discussed further below), over a range of time offsets or pn-offsets, beginning with the initial time offset. A search range of pn-offsets beginning, for example, with an initial time offset herein referred to as a minimum pn-offset, and ending with a maximum pn-offset, may be referred to in the art as the search window size for a particular antenna. The output correlation energies 421, from FHT 420, over a search window size, may yield one or more ideal pn-offsets for demodulating despread signal 408. Generally, the ideal pn-offsets will be ones in which a correlation energy of despread signal 408 is "high".

For example, upon receiving a series of 64 received bits, FHT 420 generates sixty-four outputs 421 which correlate to sixty-four possible Walsh code symbols. Each output 421, has an index, preferably six bits wide, which references one of sixty-four possible Walsh code symbols generated by M-ary orthogonal modulator 236 (shown in FIG. 2). In addition to having an index, each output 421 also has an associated complex number (not shown). Seven bits are preferably allocated to the real and imaginary portions, respectively, of the complex number, although fewer or more bits are possible.

Each output 421, further has an associated correlation energy value (not shown), commonly calculated by magnitude squaring the complex number associated with output signal 421. The correlation energy value generally corresponds to a measure of confidence, or a likelihood, that output signal 421 indexes a Walsh code W239 which corresponds to a group of received bits input to FHT 420. The correlation energy value may have any suitable bit width, and may be for example, fourteen bits wide. For example, FIG. 6 illustrates correlation energies 601, 603, and 605 obtained by FHT 420 from signal 107 associated with mobile unit 103. Correlation energies 601, 603 and 605, are accumulated with the respective correlation energies of each Walsh symbol obtained at corresponding pn-offsets 608, 618 and 628 to produce the correlation energies within a specified search window 630.

Thus, during operation of searcher 307, for a particular received signal associated with a mobile unit such as mobile unit 103, FHT 420 computes received transmission energy over a range of time offsets (pn-offsets), beginning with the initial time offset. For example, FHT 420 produces a first set of sixty four correlation energies for a group of sixty-four received bits located at the initial time offset, which may be referred to as T=0. Upon obtaining the first set of correlation energies, the FHT 420 advances to the next pn-offset at T={0+½ chip}, producing a second set of sixty-four correlation energies. Typically, searcher 307, steps through ½ chip increments until the search window size is exhausted at the maximum pn-offset. Each pn-offset yields a set of correlation energies, of which, one is considered a "winning" correlation energy. There are, of course, sixty-three "losing" correlation energies at each pn-offset.

Upon receipt of signals 107, 119, 108 and 120 at antennas 301 and 303, an antenna select algorithm (not shown) controlled by a channel processor 430 selects the appropriate antennae to be searched. For instance, antennas 301 and 303 maybe written into a control register (not shown) in channel processor 430 indicating that they are to be searched. For purposes of discussion, channel processor 430 selects antenna 301 to be searched for a transmitted signal from mobile unit 103 at a first time $t_1$, followed by selecting antenna 303 to be searched for a transmitted signal from mobile unit 103 at a second time $t_2$.

Upon advancing through the full compliment of pn-offsets associated with a search window for antenna 301, the first antenna to be searched in this example, the top eight winning correlation energies and their associated pn-offsets may be selectively buffered in a top offset random access memory (RAM) buffer 422 at a second time, $t_2$, causing a sort_done bit of the interrupt register (not shown) in channel processor 430 to be set. Concurrent with completion of antenna search 301 at the second time $t_2$, a search of signals received by antenna 303, conducted substantially as described in connection with antenna 301, begins. Upon completion of a search of signals received by antenna 303, the top eight winning correlation energies and their associated pn-offsets may be selectively buffered in top offset RAM buffer 422 at a third time, $t_3$, causing a sort_done bit of the interrupt register in channel processor 430 to be set. Each time the sort_done bit of the interrupt register in channel processor 430 is set, the top eight winning correlation energies are input to channel processor 430, and compared to a predetermined energy threshold in channel processor 430. The energy threshold may be fixed, or may be variable, based on, for example, previously calculated correlation energies. Channel processor 430 may output a number of winning correlation energies and their associated pn-offsets. For example, two winning correlation energies may be output. Finger manager software 309 then uses the two winning correlation energies to direct Rake receiver demodulator fingers F1, F2, F3 and F4 to demodulate signals, such as signals, 107 and 119, at the two winning pn-offsets.

Thus, by using the method of the present invention, generating a sort_done interrupt per antenna search completion, the results of a multipath signal search on a first antenna such as antenna 301, are made available for Rake receiver demodulation, simultaneous to beginning a multipath signal search on a second antenna such as antenna 303. Hence, search data are available more frequently, thereby facilitating an improvement of Rake receiver tracking capability.

The IS-95A reverse link channel has been specifically referred to herein, but the present invention is applicable to any digital channel, including but not limited to the forward link IS-95A channel and to all forward- and reverse-link TDMA channels, in all TDMA systems such as Groupe Special Mobile (GSM), a European TDMA system, Pacific Digital Cellular (PDC), a Japanese TDMA system, and Interim Standard 54 (IS-54), a U.S. TDMA system.

The principles of the present invention which apply to a cellular-based digital communication systems, including but not limited to personal communicating systems, trunked systems, satellite systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other forms of the invention, and embodiments other than the specific embodiments described above, may be devised without departing from the spirit and scope of the appended claims and their equivalents, and therefore it is intended that the scope of this invention will only be governed by the following claims and their equivalents.

What we claim is:

1. A method for performing a signal search in a code division multiple access wireless communication system, the method comprising the steps of:

receiving a communication signal at a first antenna to produce a first received signal;

inputting, at a first time offset, at least a first portion of the first received signal to a demodulator having a plurality of outputs to produce a first set of outputs;

selecting an output from the first set of outputs to produce a first selected output;

inputting, at a second time offset, at least a second portion of the first received signal to a demodulator to produce a second set of outputs;

selecting an output from the second set of outputs to produce a second selected output;

after selecting the first selected output and the second selected output, re-assigning a RAKE receiver finger for receiving the communication signal at the first antenna;

after re-assigning the RAKE receiver finger, receiving the communication signal at a second antenna to produce a second received signal;

inputting, at a first time offset, at least a first portion of the second received signal to the demodulator to produce a third set of outputs;

selecting an output from the third set of outputs to produce a third selected output;

inputting, at the second time offset, at least a second portion of the second received signal to the demodulator to produce a fourth set of outputs;

selecting an output from the fourth set of outputs to produce a forth selected output; and after selecting the third selected output and the fourth selected output, re-assigning the RAKE receiver finger for receiving the communication signal at the second antenna.

2. The method according to claim 1, wherein the demodulator comprises a Fast Hadamard Transform.

3. The method according to claim 1, wherein the first received signal comprises a plurality of received symbols associated with a plurality of transmitted symbols.

4. The method according to claim 3, wherein at least a portion of the first received signal comprises one received symbol of the plurality of received symbols.

5. The method according to claim 4, wherein each of the plurality of outputs of the demodulator has a value associated therewith, the value representing the likelihood that the one received symbol corresponds to a transmitted symbol of the plurality of transmitted symbols.

6. The method according to claim 5, wherein the value associated with the first selected output has the greatest likelihood.

7. The method according to claim 1, wherein the first set of outputs comprises sixty-four outputs.

8. The method according to claim 1, wherein the first time offset and the second time offset are less than or equal to one Walsh chip apart.

9. The method according to claim 1, wherein the first and second antennae are associated with a first base station.

10. The method according to claim 9, wherein the first antenna is associated with a first sector of the first base station.

11. The method according to claim 9, wherein the second antenna is associated with a second sector of the first base station.

12. The method according to claim 1, wherein the first selected output is buffered for further processing.

13. The method of claim 1, further comprising the step of:

prior to re-assigning the RAKE receiver finger adjusting the times for receiving the communication signal, generating a signal indicating that a search has been completed.

* * * * *